(12) United States Patent  
Siraky

(10) Patent No.: US 7,089,673 B2  
(45) Date of Patent: Aug. 15, 2006

(54) OPTICAL ANGLE SENSOR

(75) Inventor: Josef Siraky, Donaueschingen (DE)

(73) Assignee: Sick Stegmanm GmbH, Donaueschingen (DE)

( * ) Notice: Subject to any disclaimer, the term of this patent is extended or adjusted under 35 U.S.C. 154(b) by 0 days.

(21) Appl. No.: 10/974,254

(22) Filed: Oct. 26, 2004

(65) Prior Publication Data

US 2005/0086815 A1 Apr. 28, 2005

(30) Foreign Application Priority Data

Oct. 27, 2003 (DE) ................. 103 50 211  
Nov. 28, 2003 (DE) ................. 103 56 328

(51) Int. Cl.  
*G01B 11/26* (2006.01)

(52) U.S. Cl. ........................ 33/1 PT; 33/706

(58) Field of Classification Search ................. 33/1 N, 33/1 PT, 534, 706–708

See application file for complete search history.

(56) References Cited

U.S. PATENT DOCUMENTS

| | | | | |
|---|---|---|---|---|
| 4,414,754 A | * | 11/1983 | Lapeyre | 33/707 |
| 4,660,036 A | * | 4/1987 | Mosier | 33/1 PT |
| 4,719,449 A | * | 1/1988 | Cousseau | 33/1 PT |
| 5,129,725 A | * | 7/1992 | Ishizuka et al. | 33/707 |
| 6,442,861 B1 | * | 9/2002 | Boge et al. | 33/706 |
| 6,615,501 B1 | * | 9/2003 | Skerka et al. | 33/1 PT |
| 2002/0144413 A1 | * | 10/2002 | Hoskins | 33/1 PT |
| 2002/0148123 A1 | * | 10/2002 | Mitterreiter et al. | 33/1 PT |
| 2003/0182816 A1 | * | 10/2003 | Huber et al. | 33/707 |
| 2004/0244210 A1 | * | 12/2004 | Harrer | 33/1 PT |
| 2005/0022396 A1 | * | 2/2005 | Sano | 33/1 PT |

FOREIGN PATENT DOCUMENTS

| | | |
|---|---|---|
| DE | 3118607 A1 | 3/1982 |
| DE | 10060574 A1 | 6/2002 |
| GB | 1 550 185 | 8/1979 |

* cited by examiner

*Primary Examiner*—G. Bradley Bennett  
(74) *Attorney, Agent, or Firm*—Townsend and Townsed and Crew

(57) ABSTRACT

An optical rotary angle sensor with at least one first measurement member able to move in the measuring direction having light-transparent and non-transparent regions located on it, at least one second measurement member arranged static relative to the first measurement member in the measuring direction, and/or at least one photoelectric transducer. To keep the distance between the rotating measurement member and the static measurement member and/or the optical-electrical transducer very small, i.e. in the range of about 10–20 μm, and to make the centering of the two relative to each other independent of the formerly necessary shaft bearing, the measurement members are configured so that they are properly oriented relative to each other in the measuring direction and kept spaced apart by a guide provided between the measurement members. The guide can be a form-fitting connection in at least one of the directions not representing the measurement direction.

11 Claims, 3 Drawing Sheets

OPTICAL ANGLE SENSOR

BACKGROUND OF THE INVENTION

The invention concerns an optical sensor for determining angles of rotation.

Such optical systems all work on the principle of the object to be measured moving in a measurement direction relative to a stationary scanning system. Measurements concerning the object are then processed as light and directed onto electrical photoreceivers.

One commonly used principle for operating such optical systems is the transmitted light principle, in which the object, which could be made of glass, transparent plastic, or metal with light-transparent structures etched out, is penetrated by light, preferably parallel light. On the opposite side, the light which has been modulated by the movement of the object is transformed by photoreceivers into electrical signals. This method is relatively simple and economical to carry out.

Another principle used for such optical sensors is optically scanning the object for light reflected by it. Less common, because it is relatively costly and demands more precision parts, is the principle of interferometric scanning of the object. In this case, coherent light interferes on a lattice with a lattice width on the order of the wavelength of the light to produce an extinction or amplification of the light and, thus, a corresponding electrical modulation at the optical receiver. It is known to employ this technique in sensors employing either the transmitted light principle or the reflection principle.

The fundamental problems of all principles are, first, that the distance or spacing between the rotating object and the optical receiver or a static object must be precisely controlled for good modulation and, secondly, the two objects must be accurately centered relative to each other.

In industry, distances of between 100 to 300 µm are customary for optical sensors employing the transmitted light principle. But such relatively large distances are only attainable with modulation structures that are of about the same order of magnitude. For shaft encoders with very high resolution or with very small divisions, the distances must be kept much smaller, which then entails high costs for the mechanical support and the required precision mechanics. The centering of the objects relative to each other is done either optically with appropriate magnification optics or electrically by scanning processed optical signals. In all applications, the rotating object is supported by a separate shaft bearing, which controls both the distance of and the centering relative to the static object. Such shaft encoders are known, for example, from German patent publication DE 100 60 574 A1.

SUMMARY OF THE INVENTION

In view thereof, it is an object of the invention to make the centering of the two members, and in particular of two members which rotate relative to each other, independent of the previously required shaft and/or shaft bearing.

Another object of the invention is to keep the distance between the rotating member and the static or stationary member and/or the optical/electrical converter very small, e.g. in the range of 10–20 µm. The spacing and the centering should then be preserved even when the members are subjected to very large axial and radial accelerations.

An optical rotary angle sensor constructed according to the invention has at least one member to be measured ("measurement member") that is movable in a measurement direction and which has light-permeable and impermeable regions. There is at least one second measurement member which is static relative to the former in the measurement direction and/or at least one static photoelectric transducer. According to the invention, the measurement members are oriented relative to each other in the measurement direction by a guide provided between them. This is a simple and economical solution for centering, and the centering can be independent of the shaft bearing.

An important feature is that, instead of the costly way of guiding the two measurement members relative to each other with the familiar shaft bearing, according to the present invention the measurement members themselves provide the guiding. As a result, it is possible to maintain a desired spacing because the guide elements only assure that the spacing between the measurement members does not drop below a certain minimum value.

Advantageously, a structurally simple and economical guide made in accordance with this invention has at least one guide element arranged on one of the measurement members and a guide recess formed in the other measurement member, in which the guide element is guided. The guide element is preferably configured as a guide pin. The guide element can also be a single central guide pin which sits in a central guide recess and thereby centers the measurement members. If this central guide pin, sitting in a corresponding central guide recess on the other measurement member, has a pointed configuration, and engages the bottom of the guide recess with its point, friction losses can be minimized. This permits, without problems, rotary speeds of up to 10,000 rpm and more, as are required in present-day shaft encoders.

Some friction at the guides is solved or at least lessened by using a transparent fluid with adhesive action as a lubricant between the measurement members to lessen the friction when the two rotate relative to each other. The viscous material has the further major advantage that it can be employed to keep the measurement members spaced apart, and the spacing can be very small depending on the quantity of the medium that is present; e.g. it can be in the range of 10–20 µm.

Moreover, the viscous medium has the further major advantage that, as a result of the adhesive action, the non-rotatable static measurement member or transducer which is able to move in the axial direction is kept at a constant distance from the rotating measurement member as dictated by the viscous medium. An absolute minimum spacing between the members is set by the guide, e.g. by the length of the guide pin and the depth of the guide recess.

In one embodiment of the invention, the guide is formed by a guide groove in one of the measurement members, running in the measurement direction, and at least one pin at the other measurement member that engages the guide groove. The guide groove can have a cross-section which narrows in the direction of the depth of the groove, in particular a triangular cross-section. The guide groove forms a concentric guide for the guide pin or pins. The measurement members are then guided somewhat similar to a record player arm, where the needle travels in the record grooves. The guide element can also be configured as a guide fin.

In a further embodiment of the invention, exact guidance is assured by guiding the guide pin in a form-fitting manner in at least one of the directions not constituting the measurement direction.

According to the invention, it is proposed that the measurement members are configured so that they can be guided centrally as well as form-fitted relative to the spacing between each other. This can be accomplished with a conically extending concentric depression located in one measurement member, and a conical pin sitting on the other measurement member for engaging the depression.

In a further alternative of the invention, the at least one static measurement member and/or the at least one static photoelectric transducer is non-rotatable relative to measurement members and the rotary angle being measured by a stator coupling, but remains movable in the axial and the radial directions. The rotation-rigid stator coupling preferably defines a parallelogram.

In another embodiment with a fixed static transducer, the rotating measurement member is advantageously guided by an angularly true shaft coupling.

The principle of the invention can also be used with non-optical rotary angle sensors.

DESCRIPTION OF THE PREFERRED EMBODIMENTS

Figure 1:
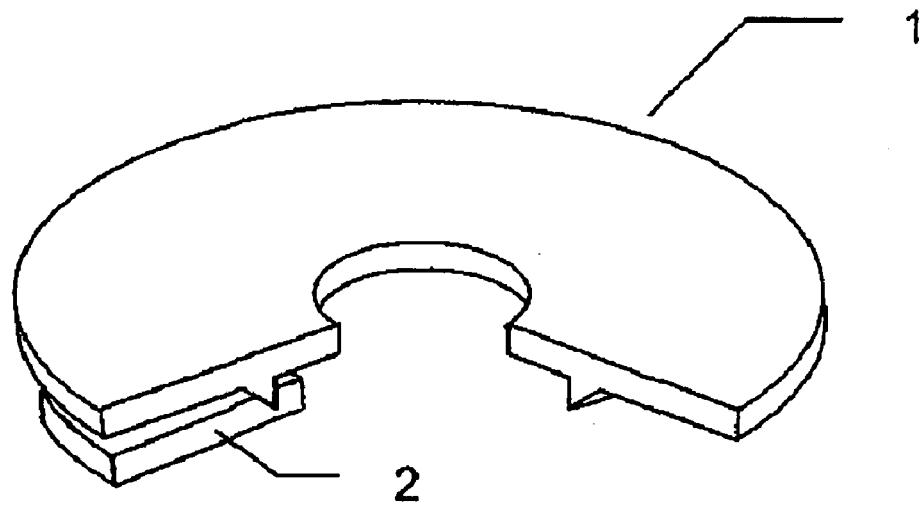
FIG. 1 is a perspective front elevational view, partially in section, of two measurement members.

A rotary angle sensor according to the invention has a first measurement member 1 that is able to move in a measurement direction and a second, static measurement member 2. By measuring the motion of measurement member 1 relative to the measurement member 2, a rotary angle can be determined, as has long been known.

According to the invention, the measurement members 1 and 2 lie with a certain spacing on top of each other, a bottom side 3 of the first measurement member 1 being opposite a top side 4 of the second measurement member 2. To assure that measurement members 1 and 2 are concentric to each other in every angular position and independently of any shaft bearing, a guide between measurement members 1 and 2 maintains them concentric with respect to each other.

Figure 2:
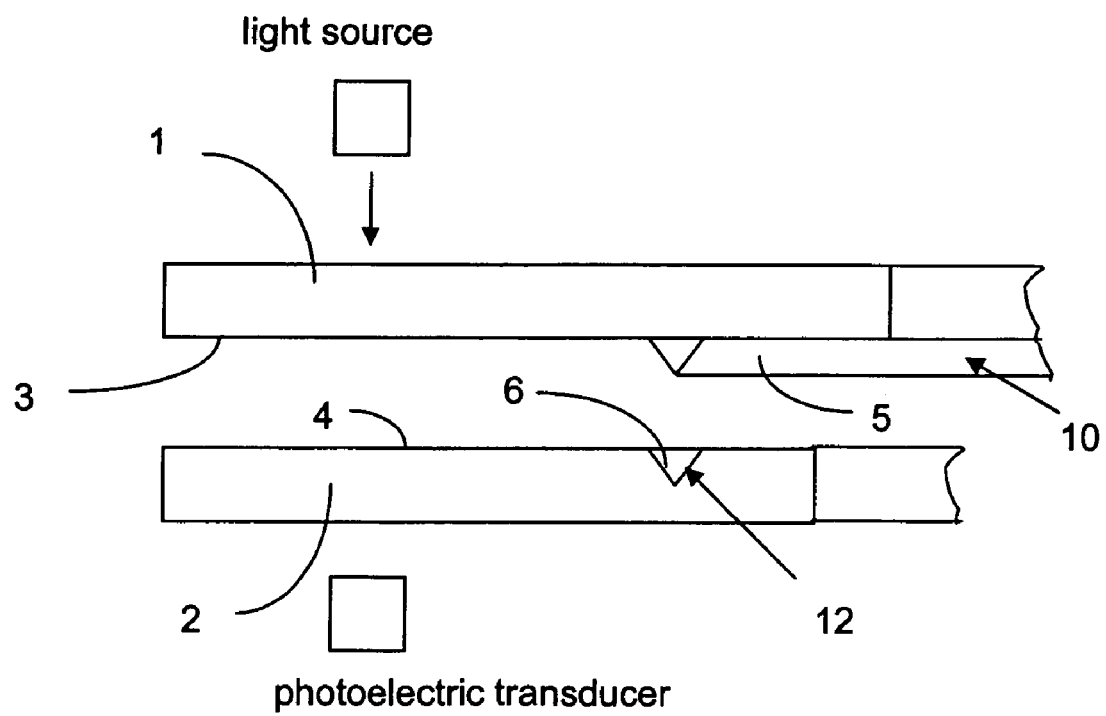
FIG. 2 is an exploded view, in cross-section, through the measurement members of FIG. 2.

The guide consists of a guide element 10 projecting from bottom side 3 of the first measurement member 1 and a guide recess 12 provided on top side 4 of the second measurement member 2, in which the guide element 10 is guided. In the embodiment of FIGS. 1 and 2, guide element 10 is configured as a guide fin 5 protruding from the under side of the first measurement member and guide recess 12 as a concentric guide groove 6 with a narrowing triangular cross-section in the top side of the second measurement member. The guide element 10 has a shape adapted to that of the guide recess 12 as is shown in FIG. 2. A form-fitted connection then exists between the measurement members 1 and 2 in at least one direction which does not correspond to the measurement direction. In the illustrated embodiment, a form fit occurs in the radial direction. Due to guide fin 5 traveling in the guide groove 6, the measurement members are precisely guided relative to each other during rotations with only a very small distance between them.

Figure 4:
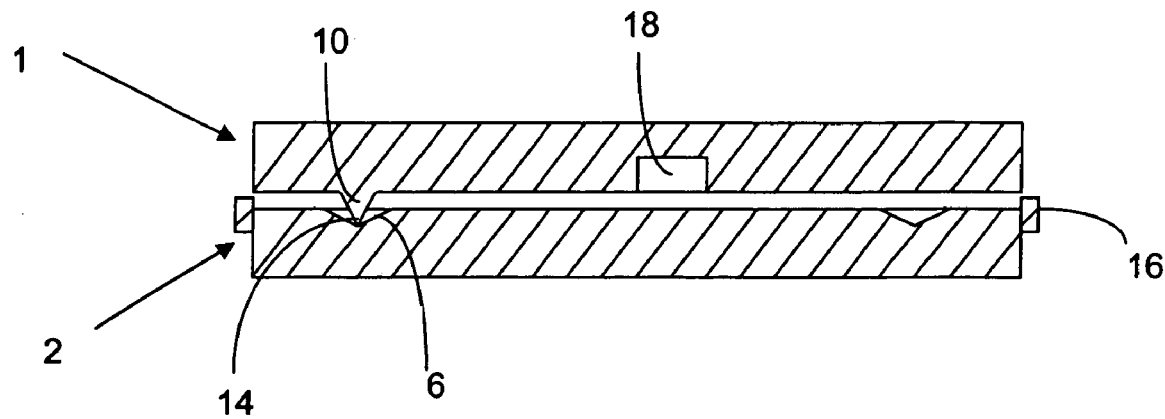
FIG. 4 is a cross-section through the measurement members of FIG. 3, when placed on top of each other.
Figure 5:
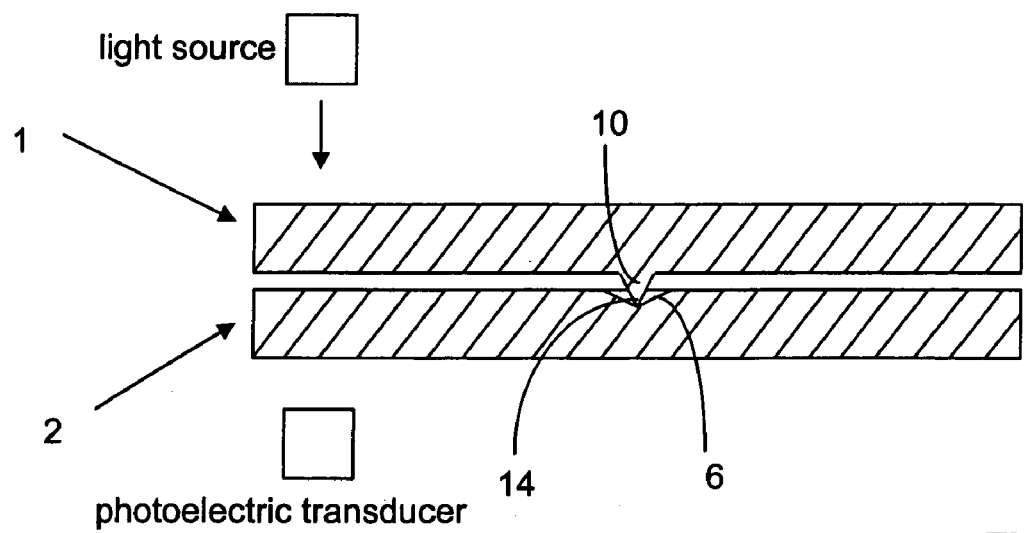

However, it can also be sufficient to hold only a tip 14 of guide element 10 without play in a direction not corresponding to the measurement direction, i.e. in the radial direction. This embodiment of the invention is shown in FIG. 4. In another sample embodiment that is not depicted, the guide element is only a single central guide pin that narrows to a point. The pin engages a central, rotationally symmetrical guide recess to center the measurement member. Only the tip of the central guide pin engages the bottom of the guide recess, which is preferably tapered to correspond to the shape of the pin. This provides a very exact adjustment in the radial direction and minimizes unavoidable friction losses. This permits without problems rotary speeds in the range of 10,000 rpm or more, as are required in present-day shaft encoders.

To prevent measurement members 1 and 2 from lying directly on top of each other and from rotating relative to each other, a viscous, preferably optically transparent, medium is placed between them to enable an optical scanning of the measurement members 1 and 2. At the same time, this medium has an adhesive effect so that overall the spacing between the two measurement members 1 and 2 can be set with the medium. This distance can be very small (10–20 μm) and is limited in a downward direction by the height of the guide element 10 and the depth of the guide recess 12, as is illustrated in FIG. 4.

To prevent a loss of viscous medium, a fluid barrier 16 is provided, for example, at the edge of one of the measurement members. Since, however, the medium can disappear over time, a reservoir recess 18 can be provided in one or both measurement members, which is filled with viscous medium and from which the viscous medium can flow into the space between the two measurement members 1 and 2. This is schematically shown in FIG. 4 only, but applies to the other embodiments as well.

Figure 3:
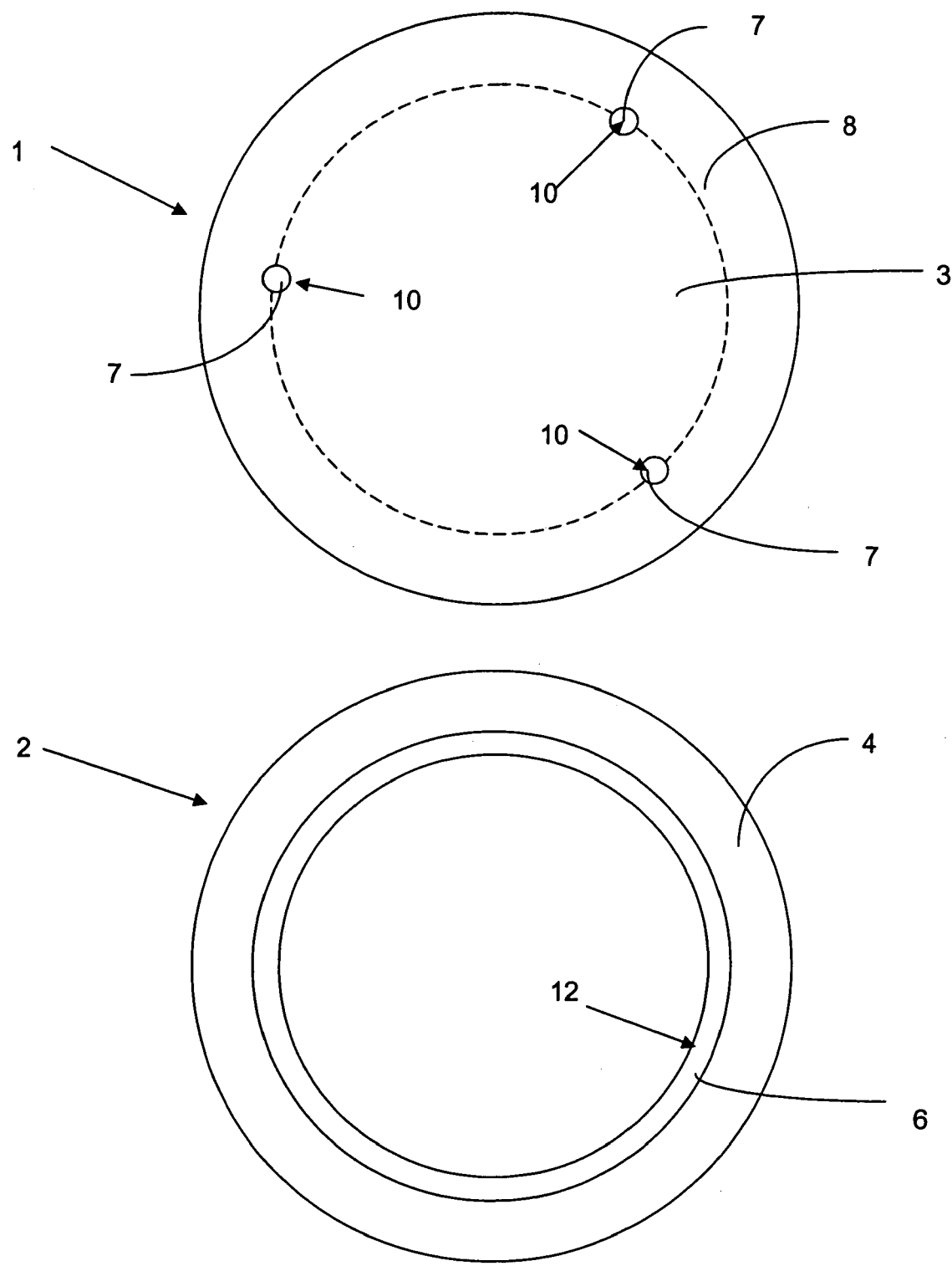
FIG. 3 is a schematic top view of the first and second measurement members of another embodiment.

In the embodiment shown in FIGS. 3 and 4, guide elements 10 are formed by three guide pins 7, which are arranged on a corresponding partial circle 8 having the same radius as the groove. The guide pins 7 have a conical shape, so that they engage guide groove 6 and provide a guiding effect in the manner of the earlier described fin 5. The guide pins can be form-fitting in the radial direction or, as shown, have only their tips 14 engage and be guided by the bottom of the groove. Once again, the viscous medium occupies the spacing between the measurement members.

The at least one static measurement member 1 or 2 and/or the at least one static photoelectric transducer are non-rotatably mounted relative to the rotary angle being measured, yet they remain movable in both the axial and the radial directions, so that the centering of and relative spacing between the measurement members are done exclusively by the guide according to the invention to assure an orientation that is as exact as possible. The non-rotational arrangement preferably defines a parallelogram, and/or the rotating measurement member should be guided by an angularly true shaft clutch. In this manner, the guidance provided by the present invention assures an optimal orientation of the measurement members of rotary angle sensors.

What is claimed is:
1. A rotary angle sensor, comprising;
    at least a first measurement member movable in a measuring direction and having. light-transparent and non-transparent regions located on it;
    at least one second measurement member arranged static relative to the first measurement member in the measuring direction, and/or at least one static photoelectric transducer; and
    a guide arranged between the measurement members which orients the measurement members relative to each other in the measuring direction, wherein the guide comprises at least one guide element arranged on one of the first and second measurement members and at least one guide recess formed in the other of the first and second measurement members which guides the guide element, wherein the guide element comprises a guide pin arranged centrally on the measurement member, which guide pin tapers to a point in a depth direction of the guide recess.

2. A rotary angle sensor according to claim 1, wherein the guide recess is formed by a concentric guide groove which extends in the measuring direction.

3. A rotary angle sensor according to claim 2, wherein the guide groove has a triangular cross-section which tapers in the depth direction of the groove.

4. A rotary angle sensor according to claim 1, wherein the guide element is configured as a guide fin.

5. A rotary angle sensor according to claim 1, wherein the guide pin is guided in a central guide recess on the other measurement member.

6. A rotary angle sensor according to claim 1, including a viscous, transparent medium between the measurement members.

7. A rotary angle sensor according to claim 1, wherein the guide keeps the measurement members spaced apart.

8. A rotary angle sensor according to claim 1, wherein the guide provides a form-fitting connection in at least one direction which differs from the measuring direction.

9. A rotary angle sensor according to claim 1, wherein the at least one second measurement member and/or the at least one static photoelectric transducer is non-rotatably arranged relative to the rotary angle being measured and is movable in the axial and the radial directions.

10. A rotary angle sensor according to claim 9, wherein the second measurement member and/or the static photoelectric transducer define a parallelogram which prevents rotatable movements of the second measurement member and/or the static photoelectric transducer.

11. A rotary angle sensor according to claim 1, including an angle maintaining shaft coupling for guiding the rotating measurement member.

* * * * *